United States Patent
Gumeci et al.

(10) Patent No.: US 10,033,046 B2
(45) Date of Patent: Jul. 24, 2018

(54) TRANSITION METAL CONTAINING NITROGEN-DOPED CARBON SUPPORT STRUCTURE FOR SULFUR ACTIVE MATERIAL AS A CATHODE FOR A LITHIUM-SULFUR BATTERY

(71) Applicant: Nissan North America, Inc., Franklin, TN (US)

(72) Inventors: Cenk Gumeci, Walled Lake, MI (US); Dianne Atienza, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 96 days.

(21) Appl. No.: 15/339,495

(22) Filed: Oct. 31, 2016

(65) Prior Publication Data

US 2018/0123136 A1    May 3, 2018

(51) Int. Cl.
*H01M 4/13*        (2010.01)
*H01M 4/66*        (2006.01)
*H01M 10/0525*     (2010.01)
*H01M 4/36*        (2006.01)
*H01M 4/38*        (2006.01)
*H01M 4/139*       (2010.01)
(Continued)

(52) U.S. Cl.
CPC ......... *H01M 4/668* (2013.01); *H01M 4/0471* (2013.01); *H01M 4/13* (2013.01); *H01M 4/139* (2013.01); *H01M 4/366* (2013.01); *H01M 4/38* (2013.01); *H01M 10/0525* (2013.01); *H01M 2004/028* (2013.01)

(58) Field of Classification Search
CPC ...................................................... H01M 4/13
See application file for complete search history.

(56) References Cited

U.S. PATENT DOCUMENTS 9,225,011 B2    12/2015  Wang et al.
2014/0141328 A1  5/2014  Dai et al.

FOREIGN PATENT DOCUMENTS

JP        2013-206645    * 10/2013

OTHER PUBLICATIONS

Gumeci, Cenk, et al., Effect of pyrolysis pressure on activity of Fe—N—C catalysts for oxygen reduction, Journal of Materials Chemistry A, 2015, pp. 21494-21500, vol. 3.

(Continued)

*Primary Examiner* — Jacob Marks
(74) *Attorney, Agent, or Firm* — Young Basile Hanlon & MacFarlane, P.C.

(57) ABSTRACT

Cathodes for lithium-sulfur batteries inhibit the parasitic polysulfide shuttle effect. The cathodes contain an active material support having a transition metal-containing nitrogen doped carbon developed to host the sulfur and suppress the diffusion of polysulfides into the electrolyte by retaining them in the high surface area nanostructured pores of the carbon while the transition metals serve as anchors for the soluble species due to the transition metals' affinity for sulfur. The cathodes 12 are gram scalable and have high surface area and high conductivity. The cathode active material support includes a nitrogen-containing polymer structure doped with a sulfide precursor of one or more transition metals selected from the group containing Fe, V, Mo, W, Co, Ni, Cu and Zn.

20 Claims, 1 Drawing Sheet

(51) Int. Cl.
*H01M 4/04* (2006.01)
*H01M 4/02* (2006.01)

(56) References Cited

OTHER PUBLICATIONS

Pang, Quan, et al., Review—The Importance of Chemical Interactions between Sulfur Host Materials and Lithium Polysulfides for Advanced Lithium-Sulfur Batteries, Journal of the Electrochemical Society, 2015, pp. A2567-A2576, vol. 162.

Kamphaus, Ethan P., et al., Long-Chain Polysufide Retention at the Cathode of Li—S Batteries, The Journal of Physical Chemistry, Feb. 10, 2016, pp. 4296-4305, vol. 120.

Zhang, Sheng S., Liquid electrolyte lithium/sulfur battery: Fundamental chemistry, problems, and solutions, Journal of Power Sources, 2013, pp. 153-162, vol. 231.

Dai, Xiaoping, et al., Metallic Cobalt Encapsulated in Bamboo-Like and Nitrogen-Rich Carbonitride Nanotubes for Hydrogen Evolution Reaction, ACS Applied Materials & Interfaces, 2016, pp. A-J.

\* cited by examiner

TRANSITION METAL CONTAINING NITROGEN-DOPED CARBON SUPPORT STRUCTURE FOR SULFUR ACTIVE MATERIAL AS A CATHODE FOR A LITHIUM-SULFUR BATTERY

TECHNICAL FIELD

This disclosure relates to a lithium-sulfur battery comprised of a two compartment cell with polysulfide migration prevention.

BACKGROUND

The lithium-sulfur battery (Li—S battery) is a rechargeable battery, notable for its high energy density. Li—S batteries may be a successful alternative to lithium-ion cells because of their higher energy density and reduced cost from the use of sulfur. However, Li—S batteries do present some challenges that must be addressed before the advantages of Li—S batteries can be fully appreciated. For example, during discharge, polysulfides form at the cathode of the batteries. Certain higher order, soluble polysulfides may migrate to the anode and react with the anode, causing a reduction in battery performance. These polysulfides diffuse through the electrolyte to the anode where they are reduced to lower polysulfides that, in turn, diffuse back through the electrolyte to the cathode to be oxidized to higher polysulfides. This causes a continuous shuttle effect, resulting in low battery efficiency.

SUMMARY

Disclosed herein are cathodes that inhibit the parasitic polysulfide shuttle effect. The cathodes contain an active material support having a transition metal-containing nitrogen doped carbon developed to host the sulfur and suppress the diffusion of polysulfides into the electrolyte by retaining them in the high surface area nanostructured pores of the carbon while the transition metals serve as anchors for the soluble species due to the transition metals' affinity for sulfur. The cathodes are gram scalable and have high surface area and high conductivity.

The cathode active material support comprises a nitrogen-containing polymer structure doped with a sulfide precursor of one or more transition metals selected from the group containing Fe, V, Mo, W, Co, Ni, Cu and Zn.

Also disclosed are methods of preparing a cathode for a lithium-sulfur battery. One method comprises preparing an active material support comprising: pyrolyzing, at a temperature greater than or equal to 800° C. and less than or equal to 1200° C., a nitrogen-containing polymer, carbon, and a sulfide precursor of one or more transition metal selected from the group containing Fe, V, Mo, W, Co, Ni, Cu and Zn; and mixing the active material support with an active material containing sulfur.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Chemical processes in a lithium-sulfur cell include lithium dissolution from the anode surface (and incorporation into alkali metal polysulfide salts) during discharge, and reverse lithium plating to the anode while charging. The lithium, during discharge, is transported across the separator from the anode to the cathode and reacts with sulfur to undergo the following reaction, with a reverse reaction occurring when the cell is charged:

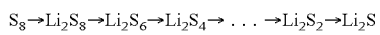

$$S_8 \rightarrow Li_2S_8 \rightarrow Li_2S_6 \rightarrow Li_2S_4 \rightarrow \ldots \rightarrow Li_2S_2 \rightarrow Li_2S$$

Across a separator, sulfur polymers form at the cathode as the cell charges:

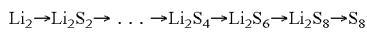

$$Li_2 \rightarrow Li_2S_2 \rightarrow \ldots \rightarrow Li_2S_4 \rightarrow Li_2S_6 \rightarrow Li_2S_8 \rightarrow S_8$$

During the discharge and charge of Li—S batteries, dissolved polysulfide intermediates diffuse to the anode side, get reduced, and shuttle back to the cathode side. This parasitic mechanism is called the polysulfide shuttle and will occur in the cell unless means are provided to shut the shuttle down. The polysulfide shuttle results in self discharge, low Coulombic efficiency, active material loss, and rapid capacity fade. The cathode active material support and cathodes herein address this polysulfide shuttle.

Figure 1:
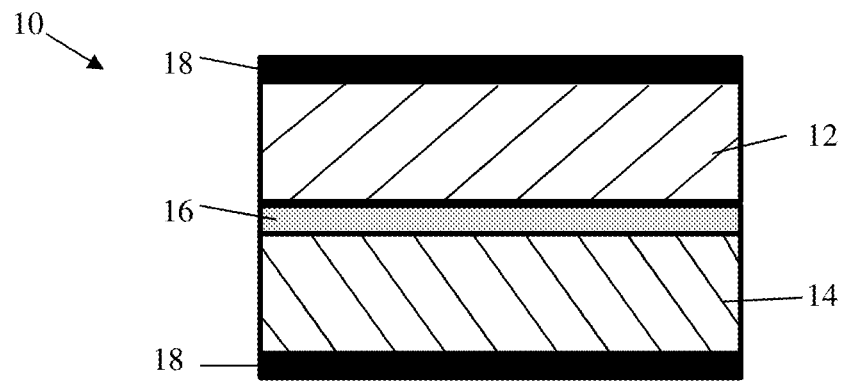
FIG. 1 is a cross-sectional view of a lithium-sulfur cell for a lithium-sulfur battery as disclosed herein.
Figure 2:
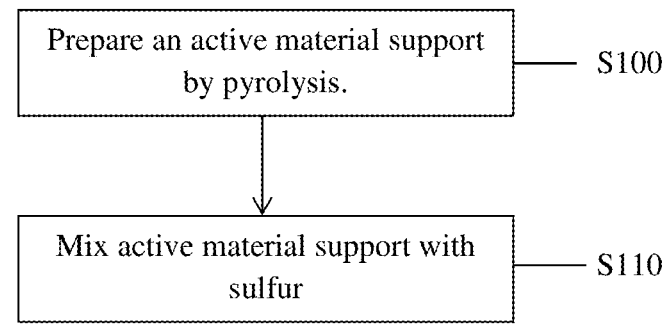
FIG. 2 is a flow diagram of a method of preparing a cathode for a lithium-sulfur battery as disclosed herein.

FIG. 1 is a cross-sectional view of a lithium-sulfur cell 10 for a Li—S battery as disclosed herein. The lithium-sulfur cell 10 includes a cathode 12 comprising sulfur containing material and an anode 14 comprising lithium. A separator 16 is positioned between the anode 14 and cathode 12. Contacts 18 are placed at opposite ends of the cell 10 and are made of stainless steel, as a non-limiting example.

The material of the separator 16 must not block the transport of lithium ions while preventing the physical contact of the anode 14 and the cathode 12, e.g. short-circuiting. In a liquid cell, the separator 16 could be a porous glass or polymer mesh that allows ion transport via the liquid electrolyte through the pores, but keeps the electrodes from contacting and shorting. Alternatively, the separator 16 can be a solid state electrolyte, which satisfies both the ion transportation and the physical separation requirements without the need for a dedicated separator and liquid electrolyte.

Disclosed herein are cathodes 12 that inhibit the parasitic polysulfide shuttle effect. The cathodes contain an active material support having a transition metal-containing nitrogen doped carbon developed to host the sulfur and suppress the diffusion of polysulfides into the electrolyte by retaining them in the high surface area nanostructured pores of the carbon while the transition metals serve as anchors for the soluble species due to the transition metals' affinity for sulfur. The cathodes 12 are gram scalable and have high surface area and high conductivity.

The cathode active material support comprises a nitrogen-containing polymer structure doped with a sulfide precursor of one or more transition metals selected from the group containing Fe, V, Mo, W, Co, Ni, Cu and Zn.

The nitrogen-containing polymer is one of melamine, polyaniline, bipyridine, 5-aminotetrazole, polyethyleneimine, poly(melamine formaldehyde) and ammonium carbamate. It is contemplated that more than one nitrogen-containing polymer can be used to form the active material support. The nitrogen content of the active material support is greater than or equal to 5 wt. % and less than or equal to 20 wt. %. To achieve this, different nitrogen-containing polymers may be used to adjust the weight percent of nitrogen. For example, bipyridine and polyaniline have low nitrogen to carbon ratios, while melamine, 5-aminotetrazole and poly(melamine formaldehyde) have high nitrogen to carbon ratios.

The nitrogen-containing polymer can also be polymeric melamine. Melamine polymerized with a solvent containing sulfur, such as dimethyl sulfoxide (DMSO), will provide additional sulfur to the active material support. A schematic of the polymerization of melamine using DMSO as a solvent is shown below.

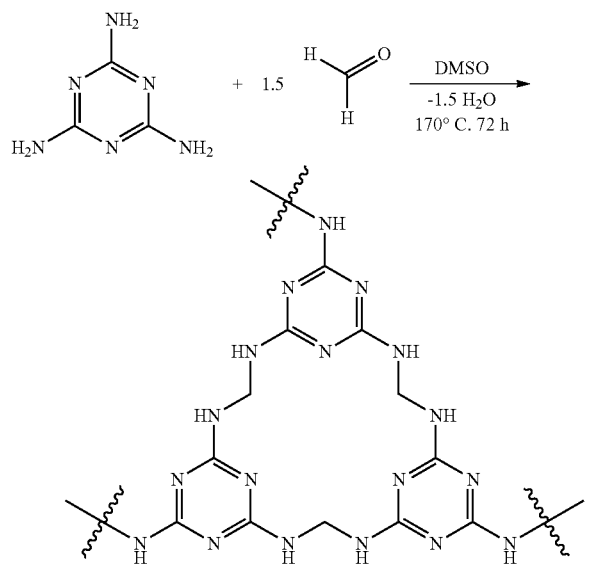

The active material support when made with polymeric melamine has the following molecular structure, wherein M is the transition metal and the sulfur is derived from the sulfide precursor:

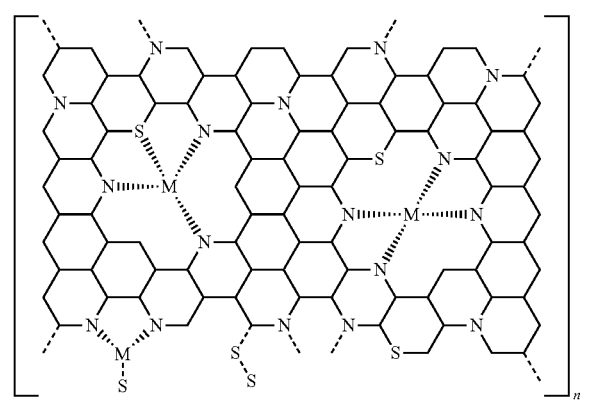

The M-S, C—S, M-N and S—S are covalent bonds. This is a non-limiting example. Repeating units shown below can be positioned at any carbon in the structure above.

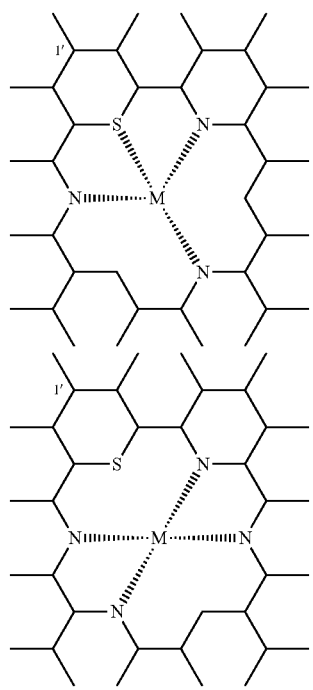

A combination of nitrogen-containing polymers can be used as well. Examples of binary combinations include, but are not limited to, melamine (50% wt.) and polyaniline (50% wt.), with the polyaniline improving the electronic conductivity of the resulting active material support; polymeric melamine (25% wt.) and polyaniline (75% wt.); and polyaniline (50% wt.) and ammonium carbamate (50% wt.), the ammonia generated by the ammonium carbamate increasing the porosity and surface area of the resulting active material support. Tertiary combinations are also contemplated.

The sulfur in the active material support is greater than or equal to 0.5 wt. % and less than or equal to 10 wt. %, whether from the sulfide precursor or both the sulfide precursor and the solvent used for polymerization. As a non-limiting example, if an iron precursor of $Fe_2(SO_4)_3$ is used, with a ratio of S/Fe of 0.86, one gram of the active material support with carbon would have 5 wt. % Fe and 4.3 wt. % S.

The active material support can further comprise carbon. The carbon increases surface area and porosity of the active material support along with increasing conductivity of the active material support. The particle size of the carbon can range from 10 nm to 100 nm. The amount of carbon and type of carbon used can be varied to achieve the desired support properties. For example, the active material support can have a surface area greater than or equal to 100 m²/g and less than or equal to 1400 m²/g. The active material support can also have a pore volume greater than or equal to 20 mL/g and less than or equal to 500 mL/g. The active material support can have conductivity of greater than or equal to 10 S/cm and less than or equal to 1000 S/cm.

The final active material support can be made from a combination of active material supports. As a non-limiting example, an active material support made from polymeric melamine and FeS can be mixed with an active material support made from polyaniline and FeS to form the final active material support structure before the active sulfur material is added. The transition metal precursor can also be different in each active material support used to produce the final active material support structure. Other non-limiting examples include combinations of a polymeric melamine derived active material support, a melamine derived active material support, and a polyaniline derived active material support. They can be combined with 33 wt. %, 33 wt. %, 33 wt. %, respectively, or 25 wt. %, 50 wt. %, 25 wt. %, respectively.

To form the cathode 12 for the lithium-sulfur cell of a Li—S battery, an active material comprising sulfur is supported on the active material support. Sulfur-containing materials suitable for use as the active material in the cathode 12 comprise element sulfur in any form, hydrogen sulfide and organic materials comprising sulfur atoms and carbon atoms, which may or may not be polymeric.

The sulfur in the cathode, which includes the active material and the sulfur in the active material support, is greater than or equal to 0.5 wt. % and less than or equal to 60 wt. %. The sulfur in the active material is uniformly distributed on the active material support. In some embodiments, the sulfur in the active material forms a coating on the active material support.

Also disclosed herein are methods of preparing a cathode for a Li—S battery. One method comprises preparing an active material support in step S100. Step S100 comprises pyrolyzing, at a temperature greater than or equal to 800° C. and less than or equal to 1200° C., the nitrogen-containing polymer, carbon, and the sulfide precursor of one or more transition metal selected from the group containing Fe, V, Mo, W, Co, Ni, Cu and Zn. Porosity, surface area and metal content can be tuned by precursor ratio to carbon, pyrolysis temperature and pressure. Preparing the active material support can further comprise, prior to pyrolyzing, polymerizing the nitrogen-containing polymer with a solvent.

In step S110, the active material support is mixed with an active material containing sulfur. The mixing method can be ball milling as a non-limiting example.

As a non-limiting example, a cathode material is prepared using FeS and polymeric melamine. Melamine is polymerized using DMSO at 170° C. under atmospheric conditions for 72 hours. The resulting polymeric melamine has the structure shown below with the composition being 33.90 wt. % carbon, 4.83 wt. % hydrogen, 39.61 wt. % nitrogen, and 5.05 wt. % hydrogen.

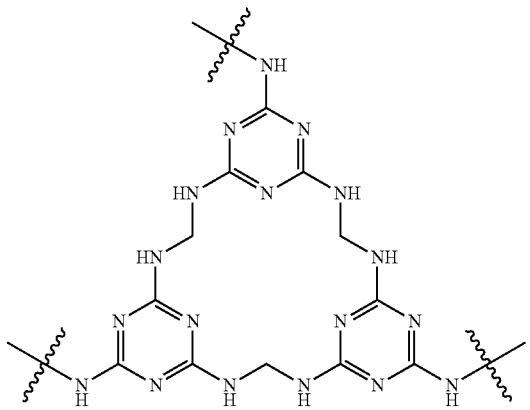 [SMILES: *Nc1nc2nc(n1)NCNc1nc(N*)nc(n1)NCNc1nc(N*)nc(n1)NCN2]

The resulting nitrogen-containing polymer is doped with a transition metal in the presence of carbon by means of high pressure pyrolysis. In this example, the transition metal is iron and the sulfide precursor is FeS. The pyrolysis occurs at a temperature equal to or greater than 800° C. and less than or equal to 1200° C. The active material support is produced having the following structure, with the Fe atoms forming Fe—N2, Fe—N3 and Fe—N4 covalent bonds as shown:

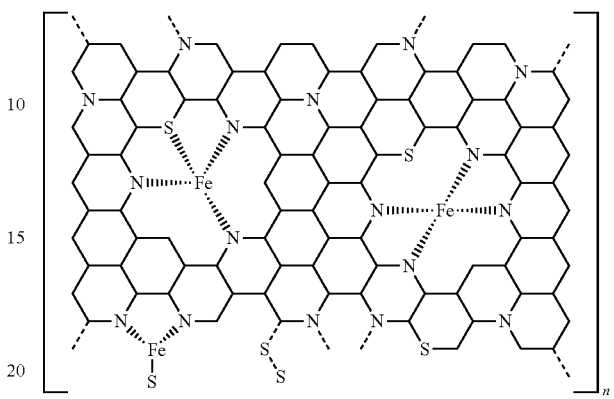

The active material support is mixed with sulfur powder using ball mixing to form the cathode active material.

All combinations of the embodiments are specifically embraced by the present invention and are disclosed herein just as if each and every combination was individually and explicitly disclosed, to the extent that such combinations embrace operable processes and/or devices/systems. In addition, all sub-combinations listed in the embodiments describing such variables are also specifically embraced by the present device and methods and are disclosed herein just as if each and every such sub-combination was individually and explicitly disclosed herein.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A cathode for a lithium-sulfur battery comprising:
an active material support comprising a nitrogen-containing polymer structure doped with a sulfide precursor of one or more transition metals selected from the group containing Fe, V, Mo, W, Co, Ni, Cu and Zn; and
an active material comprising sulfur supported on the active material support.

2. The cathode of claim 1, wherein the nitrogen-containing polymer is one or more of melamine, polymeric melamine, polyaniline, bipyridine, 5-aminotetrazole, polyethyleneimine, poly(melamine formaldehyde) and ammonium carbamate.

3. The cathode of claim 2, wherein the nitrogen-containing polymer is a combination of two or more of polymeric melamine, melamine and polyaniline.

4. The cathode of claim 2, wherein the nitrogen-containing polymer is a combination of polyaniline and ammonium carbamate.

5. The cathode of claim 1, wherein the nitrogen-containing polymer is polymeric melamine and the active material support further includes additional sulfur that is covalently bonded to the transition metal, the additional sulfur derived from the solvent used during polymerization of the melamine to produce the polymeric melamine.

6. The cathode of claim 1, wherein the cathode has a nitrogen content of greater than or equal to 5 wt. % and less than or equal to 20 wt. %.

7. The cathode of claim 1, wherein the sulfur in the active material support is greater than or equal to 0.5 wt. % and less than or equal to 10 wt. % and the sulfur in the cathode is greater than or equal to 0.5 wt. % and less than or equal to 60 wt. %.

8. The cathode of claim 1, wherein the active material support further comprises carbon.

9. The cathode of claim 8, wherein the active material support has a surface area greater than or equal to 100 $m^2$/g and less than or equal to 1400 $m^2$/g.

10. The cathode of claim 8, wherein the active material support has a pore volume greater than or equal to 20 mL/g and less than or equal to 500 mL/g.

11. The cathode of claim 1, wherein the sulfur in the active material is uniformly distributed on the active material support.

12. The cathode of claim 11, wherein the sulfur in the active material forms a coating on the active material support.

13. A cathode active material support for a lithium-sulfur battery comprising:
one or more nitrogen-containing polymer selected from melamine, polymeric melamine and polyaniline, doped with one or more transition metal sulfide precursor, the transition metal selected from the group containing Fe, V, Mo, W, Co, Ni, Cu and Zn; and
carbon.

14. A method of preparing a cathode for a lithium-sulfur battery, the method comprising:
preparing an active material support comprising:
pyrolyzing, at a temperature greater than or equal to 800° C. and less than or equal to 1200° C., a nitrogen-containing polymer, carbon, and a sulfide precursor of one or more transition metal selected from the group containing Fe, V, Mo, W, Co, Ni, Cu and Zn; and
mixing the active material support with an active material containing sulfur.

15. The method of claim 14, wherein the nitrogen-containing polymer is melamine, the method further comprising:
prior to pyrolyzing, polymerizing the melamine using dimethyl sulfoxide as a solvent, wherein sulfur from the dimethyl sulfoxide covalently bonds to the transition metal during pyrolyzing.

16. The method of claim 14, wherein the cathode has a nitrogen content of greater than or equal to 5 wt. % and less than or equal to 20 wt. %.

17. The method of claim 14, wherein the sulfur in the active material support is greater than or equal to 0.5 wt. % and less than or equal to 10 wt. % and the sulfur in the cathode is greater than or equal to 0.5 wt. % and less than or equal to 60 wt. %.

18. The method of claim 14, wherein the active material support has a surface area greater than or equal to 100 $m^2$/g and less than or equal to 1400 $m^2$/g.

19. The method of claim 14, wherein the active material support has a pore volume greater than or equal to 20 mL/g and less than or equal to 500 mL/g.

20. The method of claim 14, wherein the nitrogen-containing polymer is one or more of melamine, polyaniline, bipyridine, 5-aminotetrazole, polyethyleneimine, poly(melamine formaldehyde) and ammonium carbamate.

* * * * *